Dec. 4, 1951 M. J. MITCHELL 2,577,349
CORN-SHELLING ATTACHMENT FOR TWO-ROW CORN PICKERS

Filed Oct. 18, 1946 3 Sheets-Sheet 1

Inventor
Melville J. Mitchell
By Paul O. Pippel
Atty

Dec. 4, 1951 M. J. MITCHELL 2,577,349
CORN-SHELLING ATTACHMENT FOR TWO-ROW CORN PICKERS
Filed Oct. 18, 1946 3 Sheets—Sheet 3
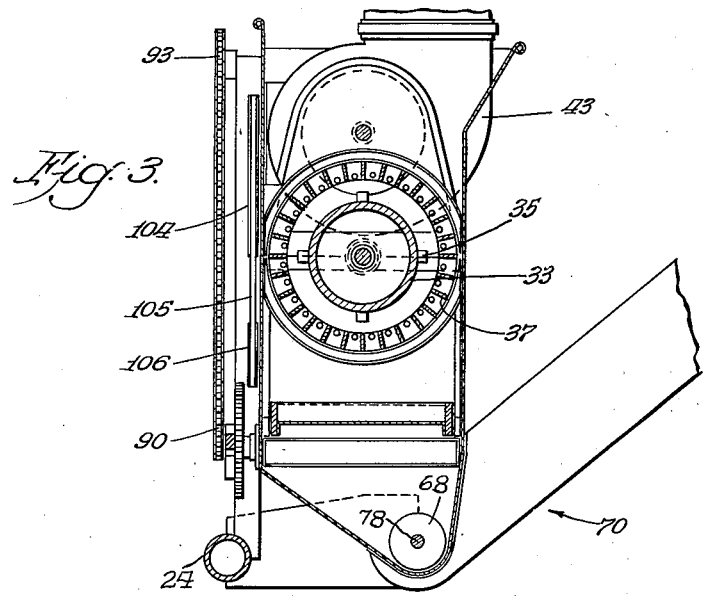
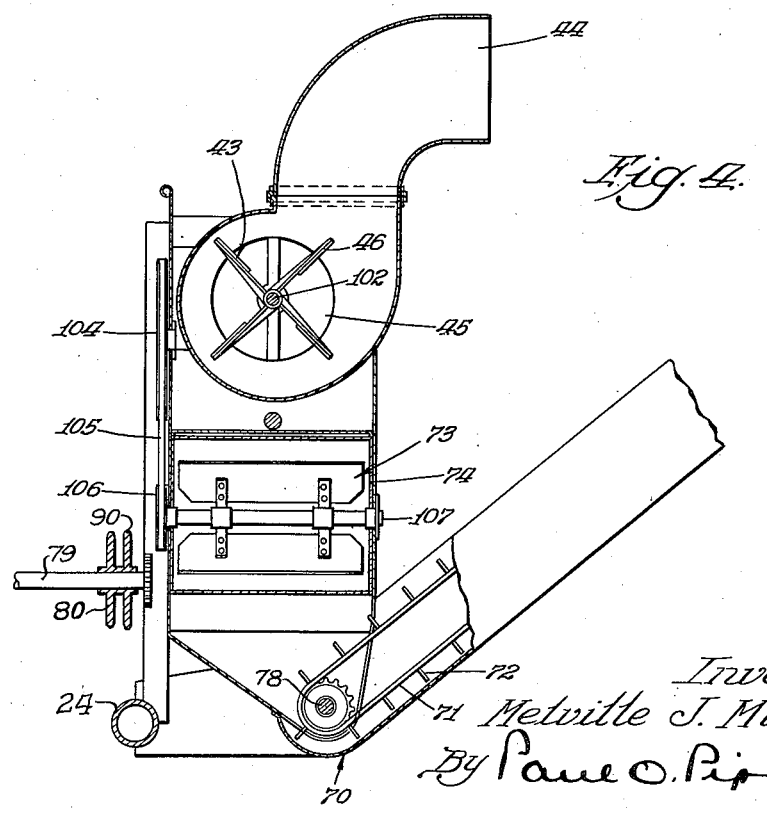
Inventor
Melville J. Mitchell
By Paul O. Pippel
Atty.

Patented Dec. 4, 1951

2,577,349

UNITED STATES PATENT OFFICE 2,577,349

CORN-SHELLING ATTACHMENT FOR TWO-ROW CORN PICKERS

Melville J. Mitchell, Highland Park, Ill., assignor to International Harvester Company, a corporation of New Jersey Application October 18, 1946, Serial No. 704,194

2 Claims. (Cl. 130—6)

This invention relates to a new and improved tractor-mounted corn sheller and has for one of its principal objects the provision of means for attaching a multiple cylinder corn sheller on the rear of a tractor having a corn picker mounted forwardly thereof and feeding the snapped ears of corn directly therefrom to the corn shelling cylinders.

An important object of this invention is to provide a corn shelling attachment for tractor-mounted corn pickers which shells the ears of corn picked from a pair of rows by separate shelling cylinders and which transports the shelled grain to a position centrally of the two shelling cylinders.

A further object of this invention is the provision of a single means for removing the husks from a dual cylinder corn sheller.

A still further object is to provide means for removing the shelled cobs and other trash associated with the shelling corn laterally at the sides of the machine, after first carrying the ears of corn inwardly to a central position between the two shelling units.

Another and still further object of this invention is to provide a unit construction of a corn sheller to be used singly or in pairs dependent upon whether mounted with a one row or two row corn picker.

Other and further important objects of this invention will become apparent from the disclosures in the following specification and accompanying drawings, in which:

Figure 3 is a sectional view taken on the line 3—3 of Figure 1; and

Figure 4 is a sectional view taken on the line 4—4 of Figure 1.

As shown in the drawings:

Figure 1:
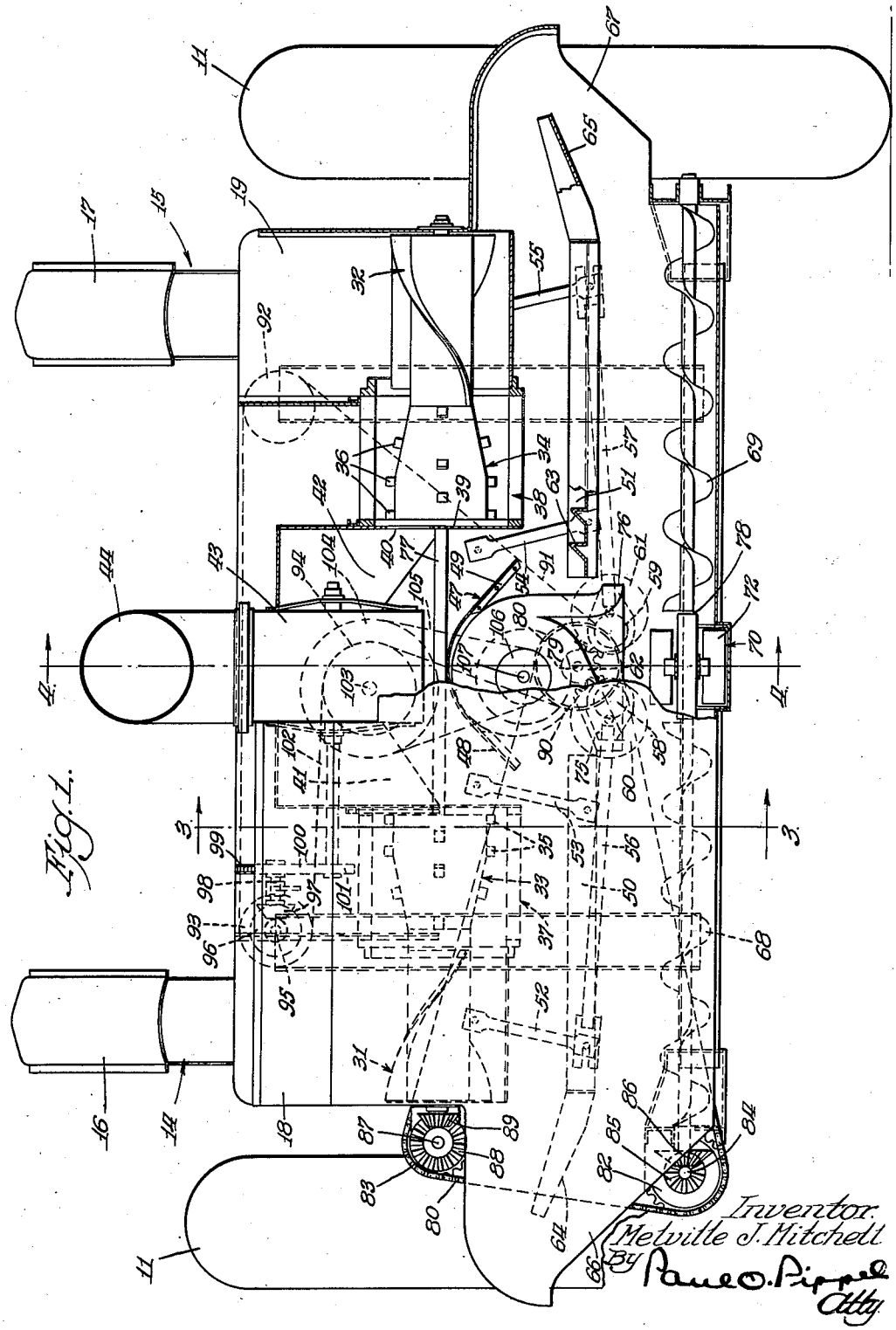
Figure 1 is a rear elevational view partially in section of the tractor-mounted corn sheller of this invention.
Figure 2:
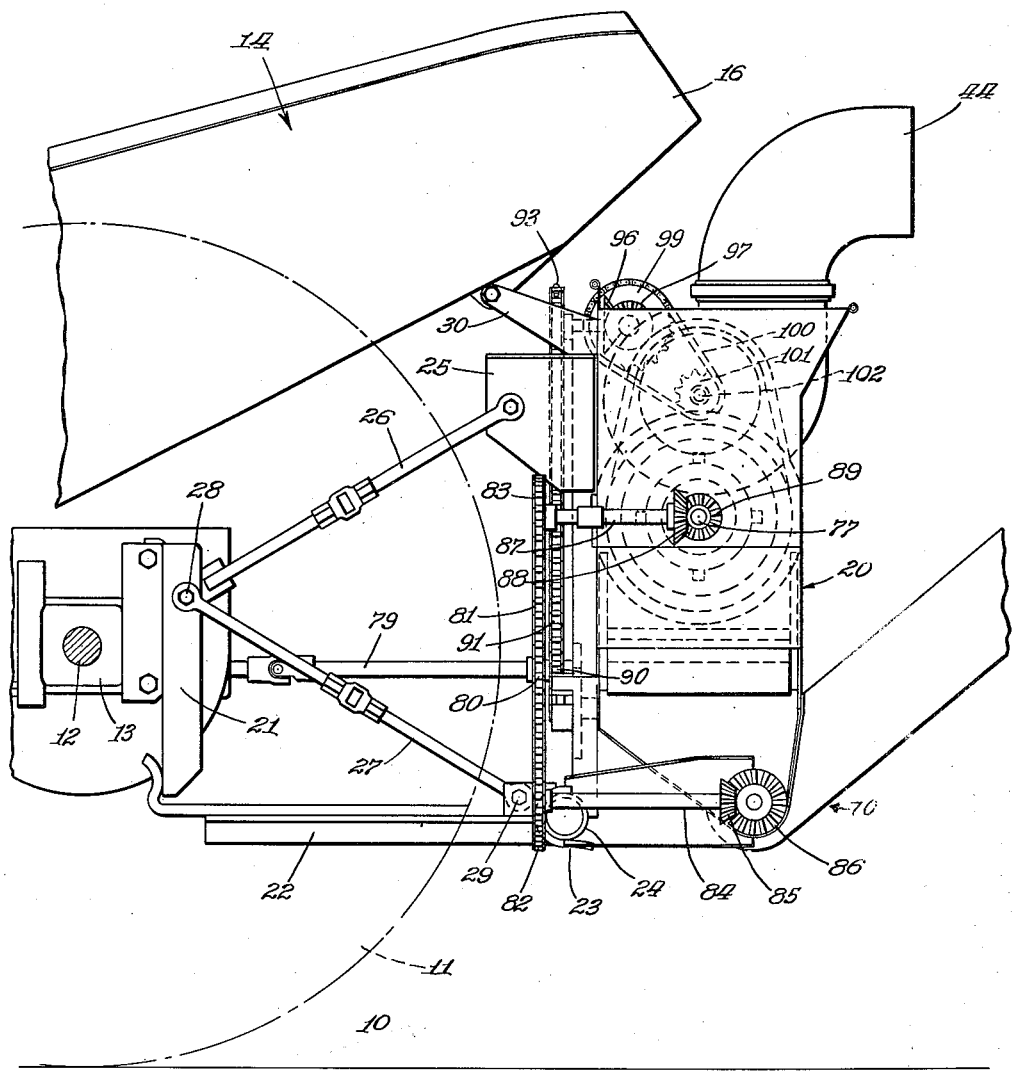
Figure 2 is a side view of the sheller attachment of this invention as shown in Figure 1.

The reference numeral 10 indicates generally a farm tractor or the like, the rear portions of which are shown in Figures 1 and 2. Tractors of this type have relatively small front steerable wheels and large rear traction wheels as shown at 11. These large traction wheels are positioned at the outer end of a drive axle 12 having a housing 13 mounted thereover. The axle housing 13 is utilized for attaching implements on the tractor. In the present instance a two-row corn picker is attached to the tractor 10 and has spaced, rearwardly extending conveyors 14 and 15. Forwardly of these conveyors 14 and 15 are snapping units which snap the ears of corn from the stalks either when they are standing or after they have been severed. The snapping units for each row are separate from one another, and each is capable of delivering the snapped ears of corn to a position rearwardly of the tractor as shown by the discharge opening of the elevating conveyors 14 and 15. Shields 16 and 17 define the openings in the conveyors 14 and 15, respectively, and direct ears of corn downwardly into spaced hoppers 18 and 19 on the corn shelling attachment unit.

A corn shelling attachment housing 20 is removably attached to the rear of the tractor 10 by means of a supporting structure including brackets 21 fastened to the axle housing 13 and a rearwardly extending supporting member 22 which has a rearwardly opening socket 23 for the reception of a tubular engaging member 24 on the corn sheller 20. The upper forward end of the corn sheller is equipped with a bracket 25 which is joined to the bracket 21 by means of an adjustable connecting link 26. In order to strengthen the support of the corn sheller to the tractor, an additional brace or connecting link 27 is extended from the point 28 on the vertical bracket 21 downwardly and rearwardly to a point of connection 29 immediately forward of the open end socket 23. A further connecting link 30 joins the upper end of the corn sheller 20 with the under side of the elevators 14 and 15 of the corn picker.

The hoppers 18 and 19 are formed in the sides of the housing 20. The ears of corn drop from the conveyor 14 into the hopper 18 and from the conveyor 15 into the hopper 19. The material in each of these hoppers is then fed toward the center of the machine by axially aligned screw conveyors 31 and 32. Each of these screw conveyors 31 and 32 feeds the ears of corn into shelling cylinders 33 and 34, respectively, which are mounted on a common shaft 77 along with the aligned screw conveyors 31 and 32, the entire assembly being conveniently termed a transverse cylinder structure. The cylinders 33 and 34 have projections 35 and 36, respectively, to cooperate with a cylinder concave 37, as best shown in Figure 3, to effectively remove the kernels of corn from the cob. The concaves 37 and 38 extend around the entire periphery of the shelling cylinders 33 and 34 respectively.

The shelling cylinders and concave are relatively standard. As best shown in Figure 1 a partition 39 is positioned at the inner ends of the concaves 37 and 38 and projects upwardly from the bottom thereof to a point slightly higher than the center or axis of the cylinder. This insures that the ears remain in the shelling chamber, that is, between the lugs or projections 35 and 36 and the concaves 37 and 38 until they are substantially completely shelled. The stripped cobs pass over this partition in the space 40 provided therefor and drop into passages 41 and 42. Any husks that remain on the ears of corn after snapping also pass through the openings 40 from the concaves 37 and 38 respectively into the passages 41 and 42. A suction fan 43 is positioned within the chamber defined by the passages 41 and 42 and is adapted to create a suction on these two adjacent passages. The suction fan 43 is designed to draw in husks and other light trash, but the cobs are sufficiently heavy so that they pass downwardly through these passages in spite of the upward suction. The suction fan 43 has an upwardly extending discharge nozzle 44, as best shown in Figure 4, which is directed rearwardly so that husks and trash drawn in through the fan openings 45 and propelled upwardly by the fan blade 46 will be expelled rearwardly of the tractor-mounted corn sheller through the nozzle 44.

The stripped cobs fall downwardly through the passages 40 and 41 onto an inverted U-shaped shield 47 having arms 48 and 49 which project down into both of these passages. The shield 47 deflects the dropping cobs over onto shaker pans 50 and 51. Shaker pan 50 is suspended on a pair of links 52 and 53 and the shaker pan 51 is similarly suspended on a pair of links 54 and 55. These links 52, 53, 54 and 55 are hingedly attached at their lower ends to the shaker pans and project upwardly to hinge attachments on the housing structures of the corn sheller 20. The shaker pans 50 and 51 are agitated or driven by pitmans 56 and 57 which are attached substantially at the points of attachment of the links 52 and 55 to the pans 50 and 51, respectively, and extend inwardly toward the center of the machine where they are mounted on eccentric drive pins 58 and 59. These eccentric pins 58 and 59 are mounted on gears 60 and 61, respectively, which are driven by a pinion 62 engaging both of these gears 60 and 61. As the pinion gear 62 is driven, the gears 60 and 61 will be driven simultaneously and the shaker pans 50 and 51 will be caused to move outwardly and inwardly as the eccentric pins 58 and 59 rotate about their circular path of travel. The shaker pans receive the cobs falling down through the passages 40 and 41 over the deflector shield 47, and by means of saw-teeth 63 the cobs are carried transversely outwardly of the machine. The shaking motion of the pan acts to additionally complete the shelling of the ear so that when the cobs reach the outer ends of the pans 50 and 51 they are completely stripped of all kernels. Each of the pans 50 and 51 has an upwardly inclined end portion 64 and 65, respectively, insuring that no grain shall be carried over the ends of the shaker pans. Discharge openings 66 and 67 are provided adjacent the ends of each of the upwardly inclined ends 64 and 65 of the shaker pans.

As the kernels of corn are stripped from the ears in the two shelling chambers, the loose kernels of corn drop down through the bottom of the concaves 37 and 38 and thereupon onto and through the shaker pans and thence down onto auger or screw conveyors 68 and 69 which are mounted and driven by their common axle shaft 78. These conveyors carry the shelled corn centrally of the machine to a wagon elevator 70. This elevator is best shown in Figures 1 and 4 wherein it is evident that the conveyor includes an endless chain 71 having flights 72 adapted to scoop up the kernels of corn discharged by the augers 68 and 69 and elevate it against the bottom of the elevator housing. Certain trash and dirt particles pass downwardly through the bottoms of the concaves 37 and 38 and hence are not exhausted by the suction fan 43. The final part of this dirt passes directly downwardly through the apertured shaker pans 50 and 51. Another fan 73 positioned within a housing 74 is adapted to blow air outwardly through nozzles 75 and 76 beneath and along the shaker pans 50 and 51, respectively. The blast of air created by this fan 73 is sufficient to carry small particles of dirt over the auger conveyors 68 and 69 and discharge it at the sides through the openings 66 and 67. However, the fan 73 does not affect the falling of the relatively heavy kernels of shelled corn into the augers 68 and 69.

The drive for the various elements in this corn shelling attachment is received from the power take-off shaft 79 extending rearwardly from the tractor 10. A sprocket 80 is mounted on the power-driven shaft 79 and imparts drive to a chain 81 which extends down and around a sprocket 82 and up and over a sprocket 83 as shown in Figures 1 and 2. The sprocket 82 is fastened to a shaft 84 carrying a bevel gear 85 which drives a bevel gear 86 mounted on the end of the shaft 78. The shaft 78, as previously stated, carries the auger conveyors 68 and 69. The auger flights are arranged in such a manner that although the common shaft 78 rotates in just one direction the conveyors feed in opposite directions toward each other and toward the center of the machine so that shelled corn is carried centrally of the corn sheller to the wagon elevator 70 which also has its elevating flights 72 driven by rotation of the shaft 78.

The sprocket 83 is mounted on a shaft 87 which additionally carries a bevel gear 88. This bevel gear 88 imparts rotational drive at right angles to a bevel gear 89 mounted on the shaft 77 carrying the augers 31 and 32 and the shelling rotors 33 and 34.

A second sprocket 90 is mounted on the drive shaft 79 spaced from the sprocket 80 and imparts drive to a chain 91 which extends around sprockets 92, 93, and 94. The sprocket 93 is mounted on a shaft 95. This shaft 95 additionally carries a bevel gear 96 engaging another bevel gear 97 at right angles thereto. This bevel gear is fastened to a shaft 98 which is mounted on its other end to a sprocket 99. A chain 100 transmits rotational drive from the sprocket 99 to a sprocket 101. This sprocket 101 is mounted on a shaft 102 which as best shown in Figure 4 carries a suction fan 43.

The sprocket 94 is carried on a shaft 103. Another V-belt pulley 104 is keyed or otherwise fastened to this shaft 103, and by means of a V-belt 105 drive is carried to a V-belt pulley 106. This V-belt pulley is fastened to a shaft 107 which carries the cleaning fan 73.

In operation the machine of this invention passes through a corn field whereupon the ears are snapped and elevated by the conveyors 14 and 15 and the snapped ears dropped into the hoppers 18 and 19 respectively. At that point the ears from the adjacent rows are moved inwardly toward each other by the screw conveyors 31 and 32. After leaving these screw conveyors the ears enter the shelling chambers having therein shelling cylinders 33 and 34 and annular concaves 37 and 38. The ears of corn have their husks and kernels removed in this chamber. The removal is occasioned by the rubbing of the projections or lugs 36 against the surface of the ears and also the rubbing of the ears against each other. The grain or kernels of corn are dropped downwardly through the spaces between the concave bars and thereupon fall onto and through the shaker pans 50 and 51. The substantially stripped cobs and husks pass upwardly and inwardly through the apertures 40 into the passages 41 and 42 which communicate directly with the fan for removing the husks which are drawn in and thrown upwardly and rearwardly of the machine through the discharge nozzle 44. The cobs are sufficiently heavy so that the suction created by the fan 43 has no effect on them and they fall onto the deflector 47 having the spaced inclined walls 48 and 49. The cobs therefore fall onto the shaker pans 50 and 51, and the reciprocating movements of the shaker pans 50 and 51 with the aid of the saw teeth 63 cause the cobs to be moved outwardly, thus causing a complete stripping of any kernels remaining on the cobs. The cobs ride up and over the upwardly inclined ends 64 and 65 and thereupon out the openings 66 and 67. The fan 73 provides cleaning chambers beneath the shaker pans 50 and 51 by creating the outward blast of air thereacross thus carrying particles of dirt and other light trash to the sides of the machine and out the discharge openings 66 and 67 along with the discharge of the stripped cobs. The shelled cleaned grain then drops into the auger conveyors 68 and 69 where it is carried centrally to a wagon elevator 70 and elevated to a trailing wagon (not shown).

Numerous details of construction may be varied throughout a wide range without departing from the principles disclosed herein, and I therefore do not propose limiting the patent granted hereon otherwise than as necessitated by the appended claims.

What is claimed is:

1. A corn sheller comprising a housing structure, a sheller cylinder structure mounted substantially across the entire housing structure, a pair of sheller rotors in axial alignment mounted in said sheller cylinder structure, a hopper at each side of said structure positioned to receive snapped ears at spaced locations, said sheller rotors having means for feeding snapped ears axially toward the center of the sheller cylinder structure, a sheller rotor concave surrounding the lower portion of each end of the sheller cylinder structure, shaker screens mounted in said housing and positioned beneath each of said concaves, a fan means provided in said housing with oppositely disposed discharge openings at the center portion of the sheller cylinder structure beneath said shaker means, means whereby shelled grain is delivered to an intermediate point of the sheller cylinder structure, conveyor means for elevating said shelled grain, a suction fan positioned intermediate said sheller rotors, said suction fan being adapted to remove husks and other light-weight foreign material directly from the sheller rotors, means to permit the cobs and other such material to drop downwardly onto the shaker screens, and said housing structure having openings at the outer ends of the shaker screens to discharge material other than grain and fine material delivered thereto, said fan means being effective to discharge the fine material other than the grain.

2. A corn sheller comprising a housing structure, a shelling cylinder structure mounted substantially across the entire housing structure, a pair of sheller rotors in axial alignment mounted in said shelling cylinder structure, a hopper at each side of said shelling cylinder structure positioned to receive snapped ears at spaced locations, said sheller rotors having auger conveyor extensions projecting into said hoppers and arranged and constructed for feeding snapped ears axially into the sheller rotors toward the center of the shelling cylinder structure, a sheller rotor concave surrounding the lower portion of each end of the shelling cylinder structure, shaker screens positioned beneath each of said sheller rotor concaves, a fan means provided on said housing structure with oppositely disposed discharge openings at the center portion of the shelling cylinder structure beneath said shaker means, auger conveyors positioned under each of said shaker screens and arranged and constructed to convey material toward each other, means whereby shelled grain is delivered to an intermediate point of the shelling cylinder structure, conveyor means for elevating said shelled grain, a suction fan positioned intermediate said sheller rotors, said suction fan being adapted to remove husks and other light-weight foreign material directly from the sheller rotors, means to permit the cobs and other such material to drop downwardly onto the shaker screens, and said housing structure having openings at the outer ends of the shaker screens to discharge material other than grain and fine material delivered thereto, said fan means being effective to discharge the fine material other than the grain.

MELVILLE J. MITCHELL.

REFERENCES CITED

The following references are of record in the file of this patent:

UNITED STATES PATENTS

| Number | Name | Date |
| --- | --- | --- |
| 1,461,144 | Hanneman | July 10, 1923 |
| 1,651,037 | Mitchell | Nov. 29, 1927 |
| 1,968,998 | Elliott | Aug. 7, 1934 |
| 2,073,302 | Gilman | Mar. 9, 1937 |
| 2,299,925 | Paradise et al. | Oct. 27, 1942 |
| 2,399,740 | Hyman | May 7, 1946 |
| 2,443,031 | Gerber | June 8, 1948 |